(12) United States Patent
Bohle, II

(10) Patent No.: US 11,931,888 B2
(45) Date of Patent: Mar. 19, 2024

(54) ROBOTIC TOOL HAVING SELECTABLE COMPLIANCE MODES

(71) Applicant: ATI Industrial Automation, Inc., Apex, NC (US)

(72) Inventor: David John Bohle, II, Durham, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 883 days.

(21) Appl. No.: 16/672,027

(22) Filed: Nov. 1, 2019

(65) Prior Publication Data
US 2020/0223074 A1 Jul. 16, 2020

Related U.S. Application Data

(60) Provisional application No. 62/790,712, filed on Jan. 10, 2019.

(51) Int. Cl.
*B25J 17/02* (2006.01)
*B25J 19/06* (2006.01)

(52) U.S. Cl.
CPC ......... *B25J 17/0233* (2013.01); *B25J 19/063* (2013.01)

(58) Field of Classification Search
CPC . B23Q 3/18; G01C 21/18; F16C 11/10; B25J 17/0241; B25J 17/0258;
(Continued)

(56) References Cited

U.S. PATENT DOCUMENTS 2,926,530 A * 3/1960 Mueller ................. G01C 21/18
74/5.47
4,500,065 A * 2/1985 Hennekes .............. B23K 37/00
248/542
(Continued)

FOREIGN PATENT DOCUMENTS

CN 102640047 A 8/2012
CN 103025255 A 4/2013
(Continued)

*Primary Examiner* — Gregory Robert Weber
(74) *Attorney, Agent, or Firm* — COATS & BENNETT, PLLC

(57) ABSTRACT

A robotic tool has a longitudinal shaft, defining a longitudinal axis when the shaft is in a default, centered position. A lockout rod is moveable between first and second positions. In the first position, the lockout rod allows the longitudinal shaft to move with 360 radial degrees of compliance about the longitudinal axis. In the second position, the lockout rod limits compliance of the longitudinal shaft to only one radial angle from the longitudinal axis. In one embodiment the lockout rod is positioned adjacent (e.g., above or below) part of one ring of a 2-axis concentric ring gimbal. The lockout rod is shaped so as to not contact any part of the gimbal in the first position, allowing compliance in a full 360 radial degrees. In the second position, the lockout rod limits the motion of one ring of the gimbal, limiting compliance of the shaft to motion of the other ring, which is necessarily limited to only one radial angle. In one embodiment the lockout rod is shaped and position such that it moves between the first and second positions by rotational motion about its own longitudinal axis.

24 Claims, 8 Drawing Sheets

(58) Field of Classification Search
CPC .. B25J 19/063; B25J 17/0208; B25J 17/0216; B25J 17/0225; B25J 17/0233
USPC ..................................................... 248/182.1
See application file for complete search history.

(56) References Cited

U.S. PATENT DOCUMENTS

| | | | |
|---|---|---|---|
| 4,627,169 | A | 12/1986 | Zafred et al. |
| 5,197,817 | A * | 3/1993 | Wood ....................... F16C 11/10 403/324 |
| 10,668,631 | B2 * | 6/2020 | Rueb ..................... B25J 17/0225 |
| 2009/0092442 | A1 * | 4/2009 | Shim ....................... B25J 19/063 403/327 |
| 2018/0275640 | A1 * | 9/2018 | Schweigler .......... B25J 17/0208 |
| 2018/0283842 | A1 * | 10/2018 | Rueb .................... B25J 17/0233 |
| 2018/0304475 | A1 * | 10/2018 | Zachary ............... B25J 15/0416 |
| 2019/0009391 | A1 * | 1/2019 | Sato ........................ B23P 19/10 |
| 2019/0084056 | A1 * | 3/2019 | Sweet .................... B23B 31/08 |

FOREIGN PATENT DOCUMENTS

| | | | |
|---|---|---|---|
| CN | 105705812 | A | 6/2016 |
| CN | 106456177 | A | 2/2017 |
| CN | 108523941 | A | 9/2018 |
| DE | 3743091 | A1 | 8/1988 |
| DE | 3929311 | A1 | 3/1991 |
| DE | 4242874 | C1 | 11/1993 |
| JP | S60131106 | A | 7/1985 |
| JP | S642811 | A | 1/1989 |
| WO | WO-2005118232 | A2 * | 12/2005 ............ B25J 19/063 |

\* cited by examiner

ROBOTIC TOOL HAVING SELECTABLE COMPLIANCE MODES

FIELD OF INVENTION

The present invention relates generally to robotic tools, and in particular to a robotic tool having a longitudinal shaft selectively exhibiting radial compliance from a longitudinal axis in either 360 degrees of radial direction, or in only one radial direction.

BACKGROUND

Industrial robots have become an indispensable part of modern manufacturing. Robots perform many manufacturing tasks tirelessly, in hostile environments, and with high precision and repeatability.

In a variety of robotic applications, it is advantageous for a robotic tool to exhibit some degree of compliance. As used herein, the term "compliance" means motion of part of a robotic tool, in response to contact with a workpiece, independently of movement of a robot arm supporting and moving the tool. As one example, a deburring tool may comprise a grinding wheel at the end of a longitudinal shaft, rotationally driven by a motor within the tool. As the robot arm traces out a path, e.g., a desired outline or edge of the workpiece, the grinding wheel removes irregularities resulting from a cutting or other operation. In order to follow fine features of the workpiece, it is advantageous to have the grinding wheel press against the workpiece, and follow along small convexities or concavities in the edge or surface being dressed by compliance, as the robot arm moves along the workpiece in a straight line. Biasing forces within the tool return the shaft to a default, centered position when external forces (caused by the workpiece surface or edge irregularities) are removed.

In many applications, it is advantageous to have compliance in any direction—that is, in 360 degrees radially from a centered axis. In other applications, however, compliance is advantageously limited to only one radial direction. In a tool with X-Y pivoting, for example, it is possible for a robotic tool to "bounce" in any direction off of a work surface. Hence, for more precise control of a deburring or other operation, it is desirable to limit this potential for bounce to only one axis. If the robot arm is programmed correctly, the operative portion of the robotic tool can only bounce directly off of the workpiece, with the recentering force pushing the spindle directly back down onto the workpiece edge. Of course, this presumes that the robot arm is programmed to move through space so as to always maintain the tool orthogonal to the workpiece surface. This process, known in the art as single axis programming, requires an agile robot to be able to maneuver the tool as it traverses different workpiece features, and also requires the requisite skill and effort in programming the robot to do so.

To amortize the cost of a robotic tool over both single axis and multi axis programming, as well as to provide a single tool that can be utilized in both applications, it would be advantageous to selectively control the compliance modes of a robotic tool.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a robotic tool has a longitudinal shaft, defining a longitudinal axis when the shaft is in a default, centered position. A lockout rod is moveable between first and second positions. In the first position, the lockout rod allows the longitudinal shaft to move with 360 radial degrees of compliance about the longitudinal axis. In the second position, the lockout rod limits compliance of the longitudinal shaft to only one radial angle from the longitudinal axis. In one embodiment the lockout rod is positioned adjacent (e.g., above or below) part of one ring of a 2-axis concentric ring gimbal. The lockout rod is shaped so as to not contact any part of the gimbal in the first position, allowing compliance in a full 360 radial degrees. In the second position, the lockout rod limits the motion of one ring of the gimbal, limiting compliance of the shaft to motion of the other ring, which is necessarily limited to only one radial angle. In one embodiment the lockout rod is shaped and positioned such that it moves between the first and second positions by rotational motion about its own longitudinal axis.

One embodiment relates to a radially compliant robotic tool. The tool includes a housing and a longitudinal shaft extending from the housing. The longitudinal shaft defines a longitudinal axis when the longitudinal shaft is in a default, centered state. The tool further includes a lockout rod disposed transverse to the longitudinal axis. The lockout rod is moveable between a first position, wherein the longitudinal shaft exhibits 360 degrees of radial compliance from the longitudinal axis, and a second position, wherein the lockout rod limits the longitudinal shaft to compliance from the longitudinal axis along only one radial direction.

Another embodiment relates to a method of operating a radially compliant robotic tool. The tool includes a housing; a longitudinal shaft extending from the housing and defining a longitudinal axis in a default, centered state; and a lockout rod disposed transverse to the longitudinal axis. The lockout rod is moved to a first position and the tool is operated, wherein the longitudinal shaft exhibits 360 degrees of radial compliance from the longitudinal axis. The lockout rod is moved to a second position and the tool is operated, wherein the lockout rod limits the longitudinal shaft to compliance from the longitudinal axis along only one radial direction.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to exemplary embodiments thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
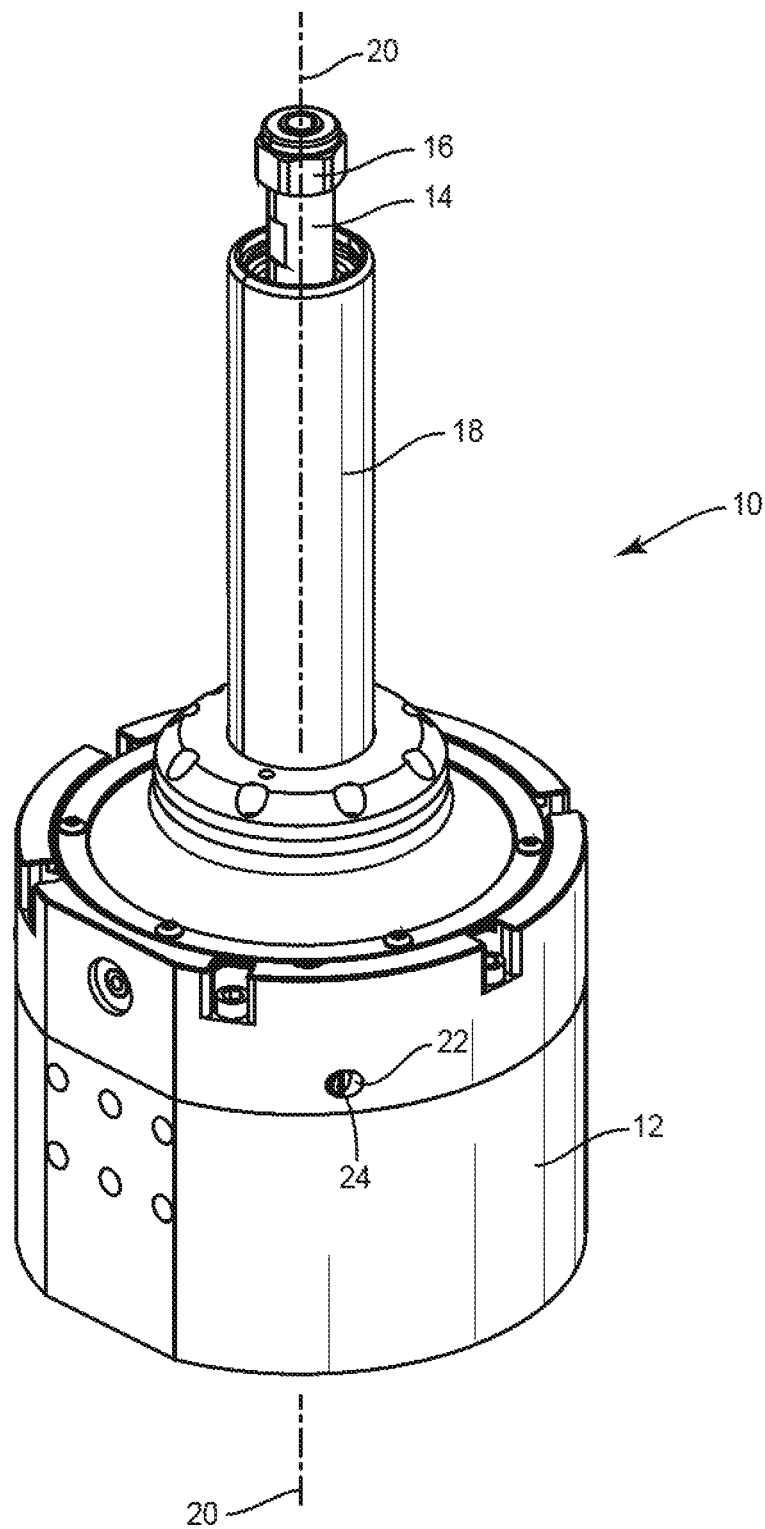
FIG. 1 is a perspective view of a robotic tool having a longitudinal shaft in a default, centered position.

The drawing figures depict a particular robotic tool, having a longitudinal shaft. In one embodiment, the robotic tool is a deburring tool. The tool is depicted to explain embodiments of the present invention to those of skill in the art. However, the invention is not limited to the tool depicted in the drawings. FIG. 1 shows the deburring tool 10. The deburring tool 10 in this embodiment has a generally cylindrical housing 12, which is attached to a robot arm (not shown). A longitudinal shaft 14 extends from the housing 12, and includes a chuck 16 at the distal end, which may accept a variety of bits, such as a grinding bit. A sleeve 18 surrounds the shaft 14. A motor within the housing 12 rotates the shaft 14, and hence rotates a grinding bit or other work surface affixed to the end of the shaft 14. The shaft 14 is biased towards alignment with a longitudinal axis 20 of the tool 10. A bore 22 through the housing 12, transverse to the longitudinal axis 20, holds a lockout rod 24, which is described in greater detail herein.

As used herein, terms of orientation refer to a tool 10 in the orientation depicted in the drawings, and in a frame of reference that moves with the tool 10. For example, in the default, centered position, the shaft 14 may be referred to as having a "vertical" orientation. Similarly, the base of the housing 12, the plane of which is perpendicular to the shaft 14, may be referred to as "horizontal." Of course, when attached to a robot arm, the robotic tool 10 may assume any orientation with respect to the horizon; hence terms describing the relative orientation of parts should only be considered within a frame of reference that moves with the tool 10.

In response to force applied by a workpiece surface or edge (that is, in response to the robot arm pressing, e.g., a grinding bit against a workpiece), the longitudinal shaft 14 exhibits compliance, or movement, away from alignment with the longitudinal axis 20. In one mode (in one embodiment, defined by a first position of a lockout rod 24, as explained further herein), the shaft 14 may exhibit compliance from the longitudinal axis 20 in any radial direction—that it, it has 360 degrees of radial compliance. In another mode (in one embodiment, defined by a second position of the lockout rod 24, as explained further herein), the shaft 14 may exhibit compliance from the longitudinal axis 20 in only one radial direction.

Figure 2:
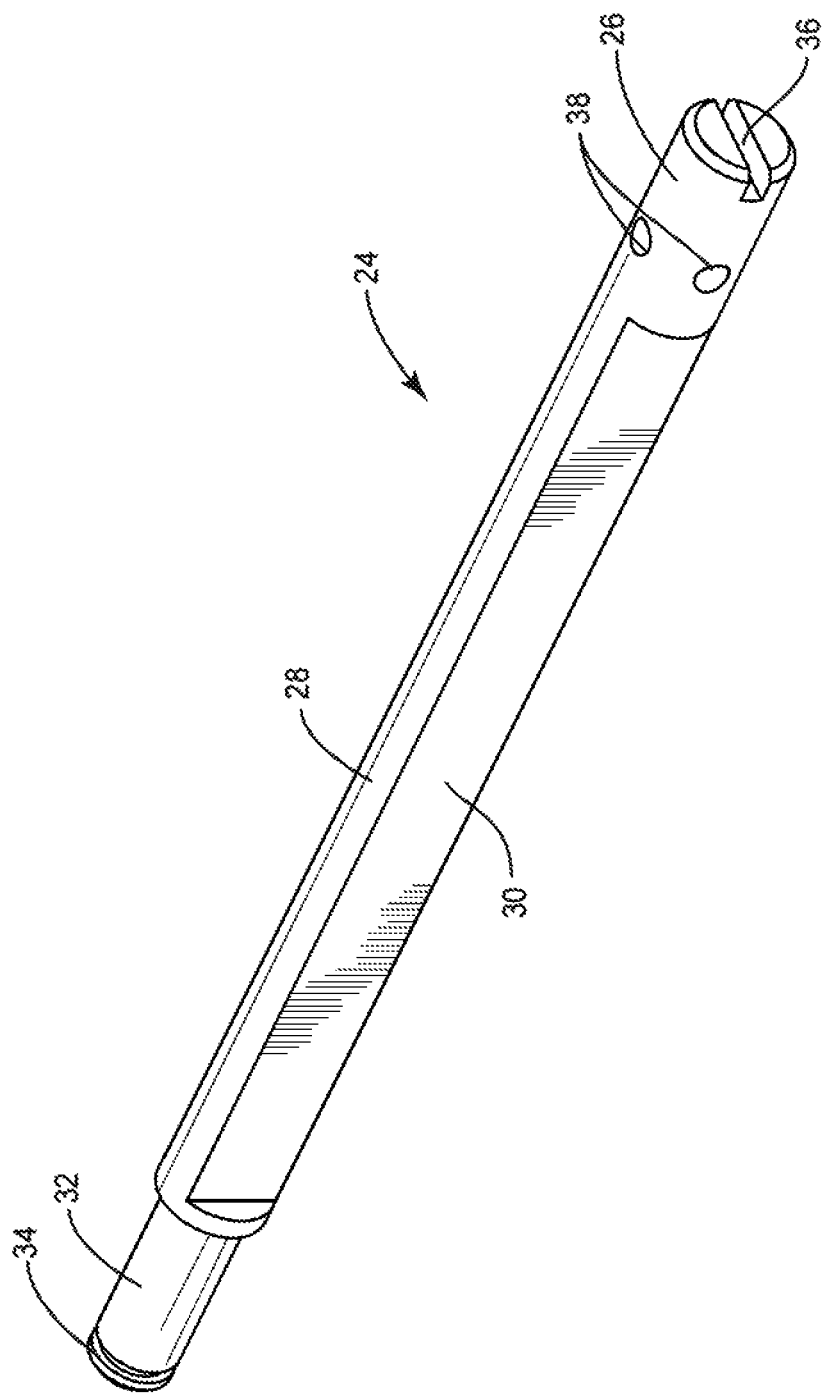
FIG. 2 is a perspective view of a lockout rod.

The lockout rod 24 is depicted in FIG. 2. The lockout rod has a generally cylindrical body 26, which extends along nearly the full length of the lockout rod 24 on two opposing cylindrical faces 28. Two opposing cutouts 30 are each positioned 90 degrees from a cylindrical face 28. The cutouts 30 provide a spacing between the flat floor of the cutout 30, and the diameter of the body 26 to either side of the cutout 30. As explained in further detail herein, this spacing on the cutouts 30—and the lack of such spacing on the cylindrical faces 28 between them—is the key to the selective compliance modes of the tool 10. Four detent recesses 38 are positioned around the lockout rod 24, 90 degrees apart from each other, with each detent recess 38 aligned with a cylindrical face 28 or cutout 30. A key 36 in one end of the lockout rod 24, such as a slot, accepts a tool, such as a flathead screwdriver, to rotate the lockout rod 24 about its axis. A cylindrical boss 32 extends from the distal end of the lockout rod 24. The boss 32 is of a slightly smaller diameter than the body 26. A concentric groove 34 is cut into the end of the boss 32, to accept a circlip.

Figure 4:
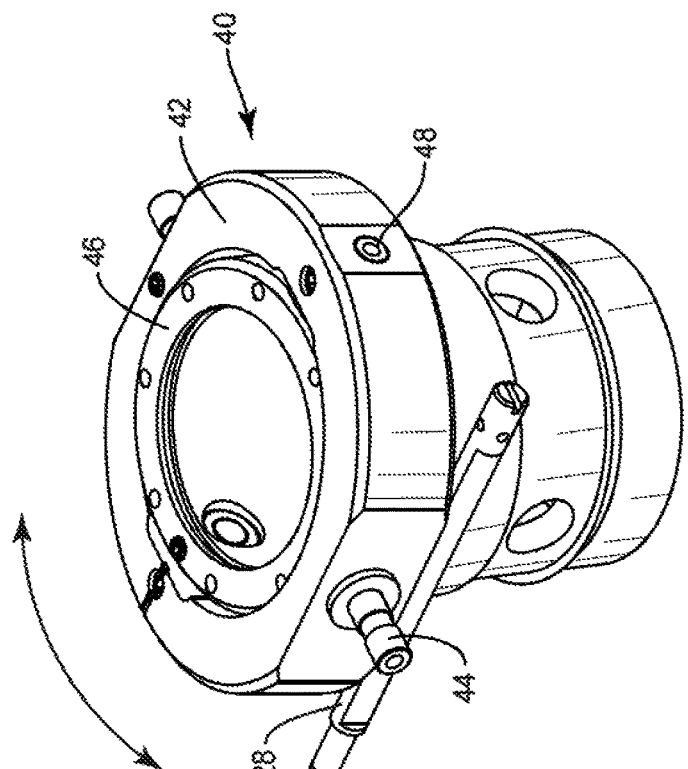
FIG. 4 is a perspective view of the gimbal with the lockout rod restricting pivoting of the outer ring.
Figure 3:
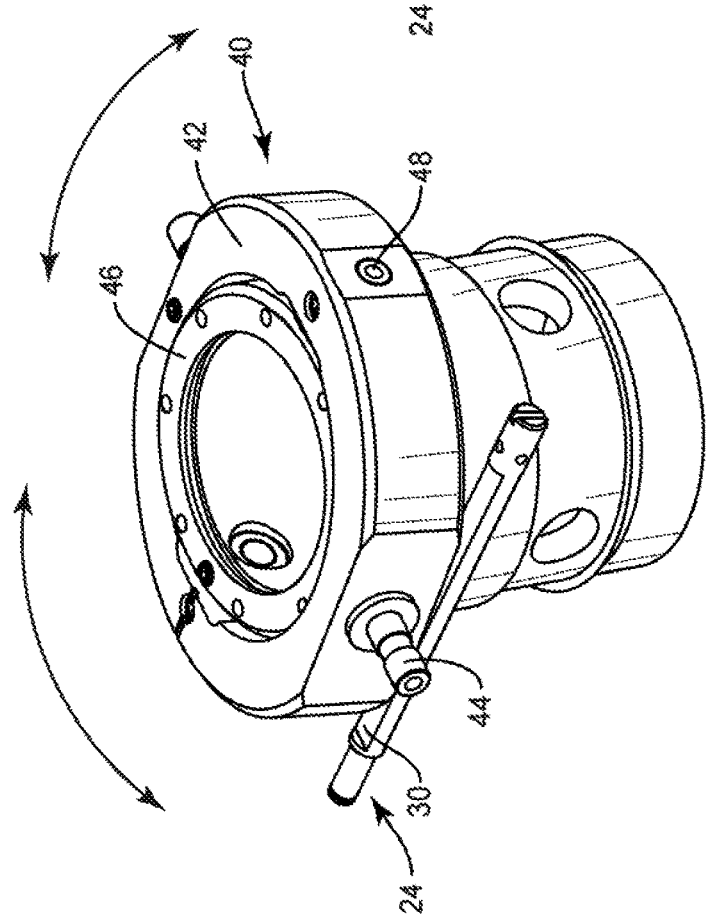
FIG. 3 is a perspective view of a 2-axis concentric ring gimbal with the lockout rod allowing pivoting of the outer ring.

In one embodiment, the radial compliance of a robotic tool 10 is facilitated by a two-axis, concentric ring gimbal 40, as depicted in FIGS. 3 and 4. As well known in the art, a two-axis, concentric ring gimbal 40 comprises a pair of rings 42, 46, one disposed within the other, wherein each ring 42, 46 is able to rotate about a corresponding axis 44, 48, wherein the two axes of rotation 44, 48 are perpendicular. In the context of providing compliance to the longitudinal shaft 14 of a tool 10, each ring is mechanically restricted to only a slight degree of rotation, referred to herein as "tilting" about an axis, rather than "rotating." Each ring 42, 46 has two pivotal mounts 44, 48 located 180 degrees opposite each other on the ring's outer surface—defining a line between the mount points and through the center of the ring 42, 46; this line is the tilt axis of the respective ring 42, 46. A first, outer ring 42 is pivotally mounted, at its two radially opposite points 44, to the housing 12, with the tilt axis normal to the tool's longitudinal axis 20. A second, inner ring 46 is similarly pivotally mounted at its two radially opposite points 48. However, the inner ring 46 is mounted to the inner surface of the outer ring 42, such that its tilt axis (the line between its two mounting points 48 and through its center) is perpendicular to the tilt axis of the outer ring 42. The entire inner ring 46 necessarily tilts about the tilt axis of the outer ring 42, and may further tilt (within the outer ring 42) about its own tilt axis, which is perpendicular. Accordingly, the inner ring 46 may freely tilt in any radial direction about the tool longitudinal axis 20 (which extends through the common center of the two rings 42, 46).

A sleeve 18 surrounding the longitudinal shaft 14 of a tool 10, such as a deburring tool, fits within the inner ring 46. In a default, centered position of the shaft 14, both the inner and outer rings 46, 42 are coplanar and "horizontal," or perpendicular to the longitudinal axis 20. In this position, the shaft 14 is aligned along the longitudinal axis 20 of the tool 10, and has a "vertical" orientation. In use, the shaft 14 of the tool may exhibit compliance from alignment with the longitudinal axis 20, caused by an externally applied force, such as by following a contour of a workpiece. A number of mechanisms are known in the art for biasing the shaft 14 to the default, centered position, so that the shaft 14 returns to alignment with the longitudinal axis 20 when an external force is removed.

Figure 5:
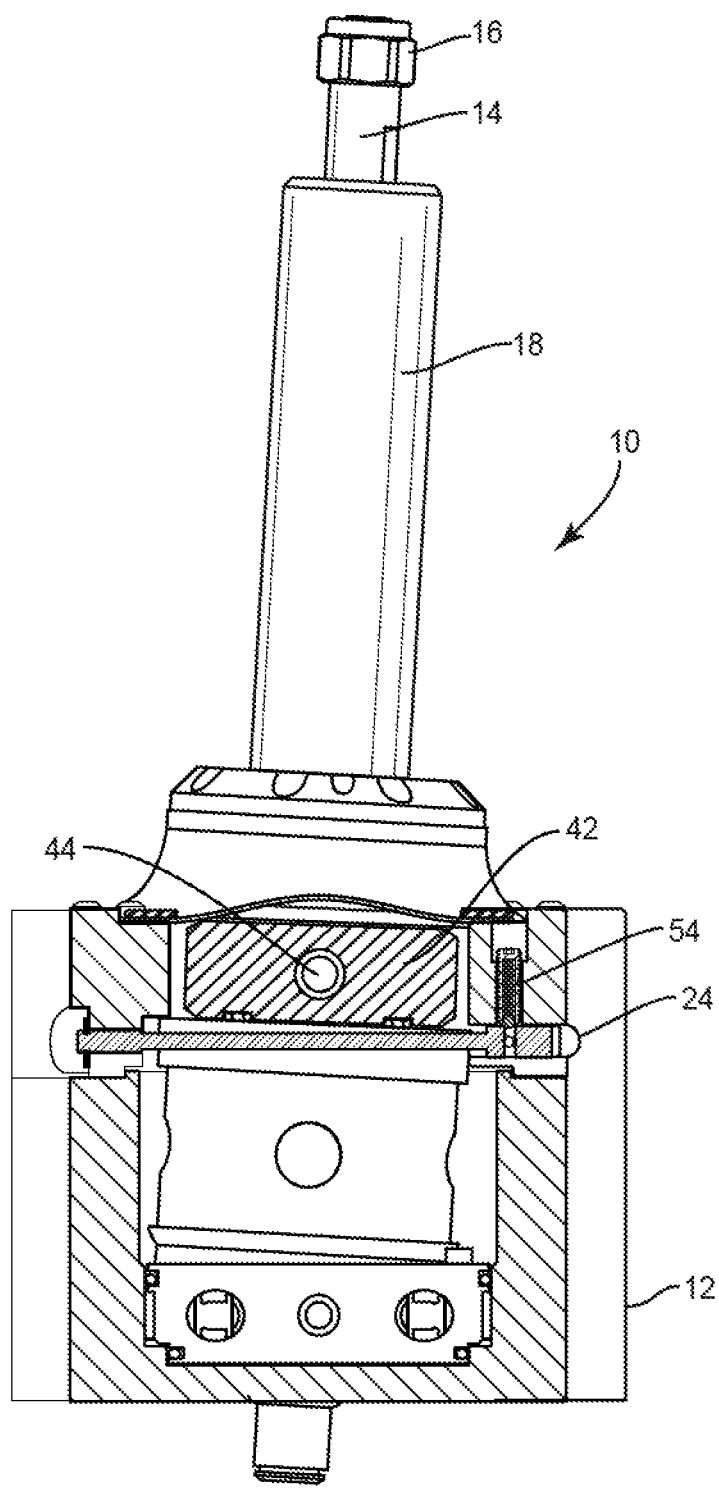
FIG. 5 is a section view of the tool showing the lockout rod in a first position, allowing pivoting of the outer ring.
Figure 6:
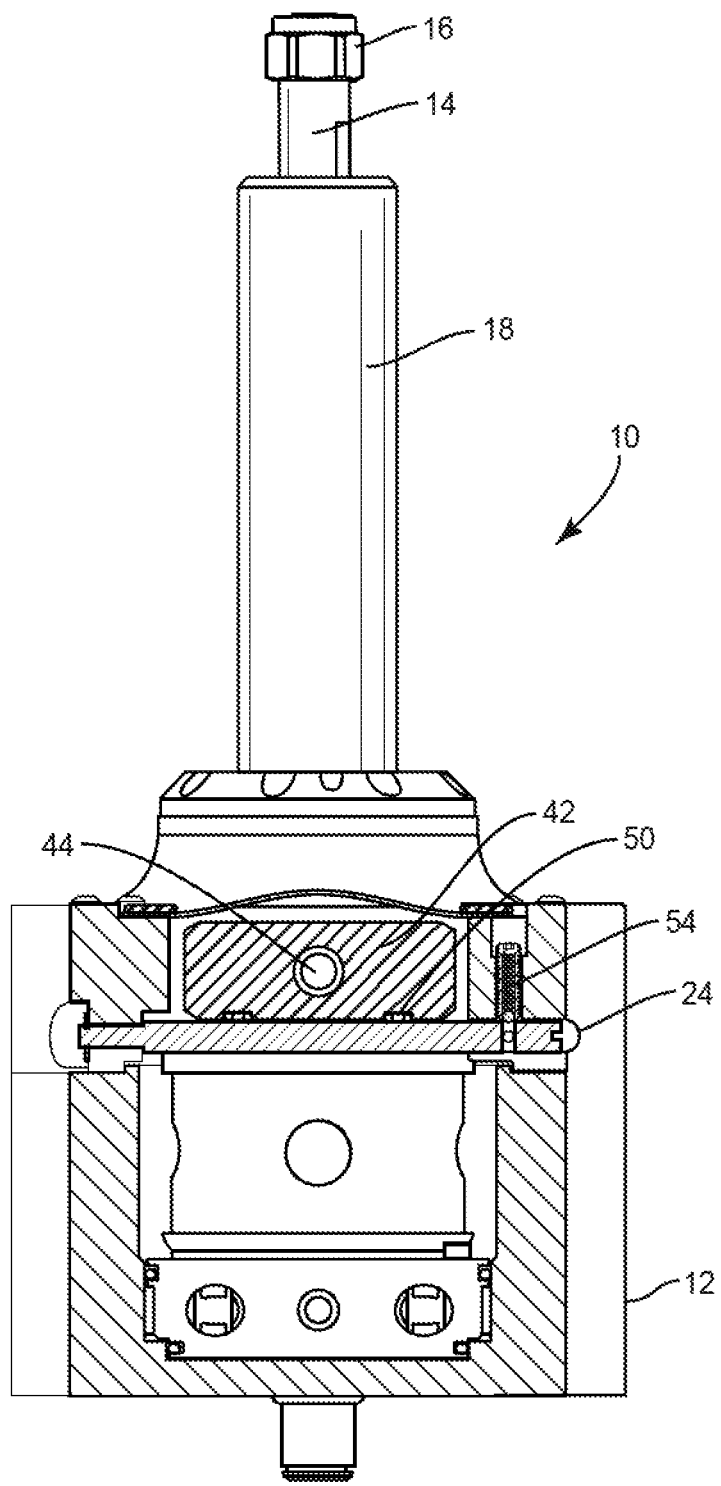
FIG. 6 is a section view of the tool showing the lockout rod in a second position, restricting pivoting of the outer ring.

As described above, it would be advantageous to operate a robotic tool 10 in two compliance modes. In one mode, as depicted in FIGS. 3 and 5, the shaft 14 exhibits compliance from the longitudinal axis 20 in any radial direction (e.g., through a full 360 degrees). In another mode, as depicted in FIGS. 4 and 6, the shaft 14 exhibits compliance from the longitudinal axis 20 in only a single radial direction. As used herein, a single radial direction includes motion along that radial direction to either side of the longitudinal axis 20—in other words, a single radial direction x of compliance also includes compliance in the direction x+180 degrees. According to embodiments of the present invention, this is accomplished by limiting, or preventing any tilting, of one ring 42 of the two-axis, concentric ring gimbal 40. With one ring 42 thus limited, only one ring 46 is left free to tilt about its tilt axis, through mount points 48. This necessarily allows the tool shaft 14 to exhibit compliance from the default, centered position (i.e., along the longitudinal axis 20) in only one radial direction—that is perpendicular to the tilt axis of the free ring 46. For example, as depicted in FIG. 6, the shaft 14 may only deviate from the longitudinal axis 20 in the direction into or out of the paper.

In one embodiment, the outer ring 42 is alternately free to tilt about its tilt axis, through mount points 44, or it is locked in a horizontal position (that is, perpendicular to the tool longitudinal axis 20), by a lockout rod 24. In a first position, as depicted in FIGS. 3 and 5, one of the cutouts 30 of the lockout rod 24 faces the outer ring 42. Because of the space provided by the cutout 30, the lockout rod 24 does not contact or otherwise interfere with tilting of the outer ring 42. The outer ring is thus free to pivot about its axis through mount points 44, as indicated by one curved arrow in FIG. 3. Simultaneously, the inner ring may pivot about its axis through mount points 48, as indicated by the other curved arrow. The result is a full 360 radial degrees of compliance by the tool shaft 14.

In a second position, as depicted in FIGS. 4 and 6, one of the cylindrical faces 28 of the lockout rod 24 arrests or immobilizes the outer ring 46 in a horizontal position, preventing it from any rotation about its tilt axis, through mount points 44. With the lockout rod 24 in the second position, only the inner ring 46 is free to tilt about its tilt axis, as indicated by the single curved arrow in FIG. 4. With the lockout rod 24 in the second position, the tool shaft 14 can exhibit only one radial angle of compliance (out of the plane of the paper in FIG. 6).

A number of configurations of a lockout rod are possible, although only one is depicted in the drawing figures. For example, in one embodiment, the lockout rod is a pin (not shown) which engages a hole (not shown) in the outer surface of the gimbal outer ring 42 to lock it in a horizontal position (the second position). The lockout rod is retracted from the hole to allow the outer ring 42 to tilt freely about its tilt axis (the first position).

In another embodiment, in the lockout rod is an elongate member, e.g., cylindrical and having a circular cross section along its entire length (not shown). The lockout rod is disposed, in the second position, beneath (or above) one side of the outer ring 42 and in contact therewith, holding the outer ring 42 in a fixed (horizontal) position. The lockout rod preferably contacts the outer ring 42 beneath (or above) one mount point 44 connecting the outer ring 42 to the housing. The lockout rod's own longitudinal axis is hence perpendicular to the outer ring tilt axis. In this position, the lockout rod prevents the outer ring 42 from tilting about its tilt axis 44 in either direction. To assume the first position, allowing the outer ring 42 to freely rotate, the lockout rod is moved to a position where it does not contact the outer ring 42, thus allowing the outer ring 42 to freely tilt in either direction about its tilt axis 44. For example, the lockout rod may be slideably moved along its longitudinal axis to a position where it is no longer below (or above) the outer ring 42. As another example, the lockout rod may be lowered (or raised) to a position spaced apart from the outer ring 42 sufficiently for the outer ring 42 to tilt through its range of compliance motion. As still another example, the lockout rod may be hinged at one end and swung through an arc to avoid contact with the outer ring 42. One disadvantage of these embodiments is that additional space is required to house the lockout rod in the first position, e.g., to the side of the gimbal 40, spaced below it, hinged, or the like.

In one embodiment, as depicted in FIGS. 2, 3, and 4, rather than moving the entire lockout rod 24 under the outer ring 24 (second position) or away from it (first position), a void or cutout 30 is formed in the lockout rod 24 along the length that is positioned beneath the outer ring 42. The lockout rod 24 is then simply rotated about its longitudinal axis to move between first and second positions. In the second position, as depicted in FIG. 4, to immobilize the outer ring 42, the lockout rod 24 is rotated such that a cutout 30 does not face the outer ring 42. Rather, one of the cylindrical faces 28 of the lockout rod 24 is positioned adjacent the outer ring 42, and the lockout rod 24 contacts the outer ring 42 along its full central length (or at cushioning points, as described further below). As described above, this prevents the outer ring 42 from tilting about its tilt axis through mount points 44, in either direction.

As depicted in FIG. 3, to allow full radial compliance, the lockout rod 24 is moved to the first position by rotating the lockout rod 24 until one of the cutouts 30 faces the outer ring 42. In this position, the floor of the cutout 30 is spaced apart from the outer ring 42, and does not touch it throughout the limited amount of rotation the outer ring 42 experiences in tilting about its tilt axis through mount points 44.

In one embodiment, the lockout rod 24 has a single cutout 30, and is moved between the first and second positions by rotating the lockout rod 24 sufficiently to face the cutout 30 towards the outer ring 42 or not, respectively. In another embodiment, as depicted in the drawing figures, a second cutout 30 is formed in the lockout rod 24, opposite the first cutout 30. In this embodiment, the lockout rod 24 alternates between first and second positions by successive 90 degree rotations about its longitudinal axis.

Figure 7:
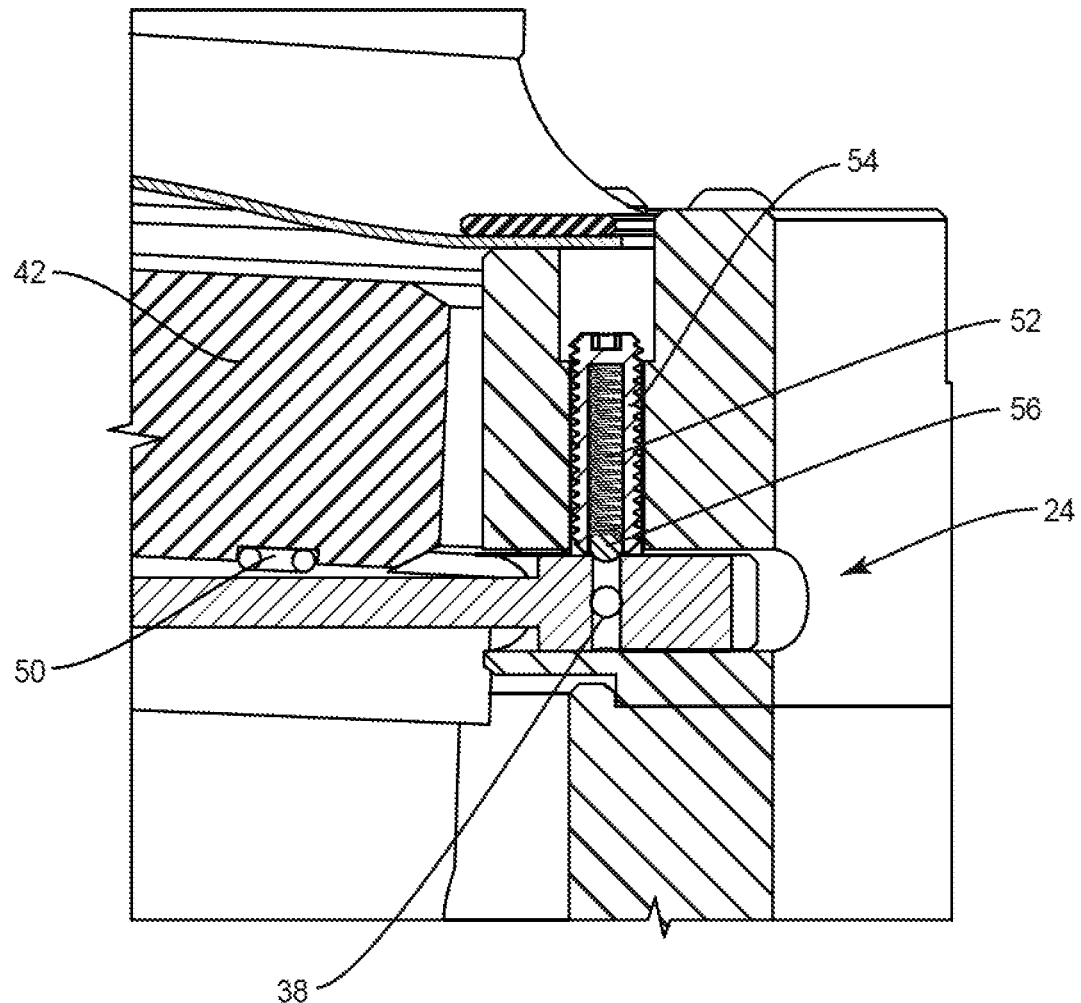
FIG. 7 is an enlarged section view showing a detent mechanism.

In one embodiment, at one end portion of the lockout rod 24, a detent mechanism provides audible and tactile feedback that the lockout rod 24 has been rotated into either the first or second position, and helps maintain the lockout rod 24 in the selected position until moved to a different position. As depicted in FIG. 2, the body 26 of the lockout rod 24 includes four detent recesses 38, spaced at 90-degree intervals around the circumference, and aligned with the centers of the cutouts 30 and cylindrical faces 28. The detent recesses 38 may be semi-spherical depressions formed in the surface of the body 26, or they may be through-holes drilled completely through the body 26. As depicted in enlarged section view in FIG. 7, a threaded plunger 54 is disposed in a correspondingly threaded hole in the housing 12. A ball member 56 extends from the plunger 54 and is biased against the lockout rod 24 by a spring 52. The ball member 56 engages successive detent recesses 38 in the lockout rod 24, as the latter is rotated between first and second positions.

In one embodiment, in the second position, the lockout rod 24 limits the outer gimbal ring 42 to a horizontal position, but does not actually contact the outer ring 42 surface. Rather, two or more cushioning elements 50 are interposed between the gimbal ring 42 surface and the lockout rod 24. In one embodiment, the cushioning elements 50 comprise elastomeric members, such as rubber or latex o-rings, which are disposed in circular seating grooves formed in the surface of the outer gimbal ring 42 (see FIGS. 6 and 7). The o-rings 50 prevent direct metal-to-metal contact between the lockout rod 24 and the outer gimbal ring 42, thus preventing damage and wear, and prolonging the useful life of the tool 10. The spacing between the lockout rod 24 and the outer gimbal ring 42 surface is slightly less than the portion of the o-rings 50 protruding from their seating grooves, such that the lockout rod 24 slightly compresses the o-rings 50 when it is moved to the second position. The o-rings 50 maintain a snug fit within their respective seating grooves, such that they are retained in the seating grooves when the lockout rod 24 is moved to the first position (and does not contact the o-rings 50). As used herein, any reference to the lockout rod 24 "contacting" the outer gimbal ring 42 (or similar terminology) includes both direct contact, and effective contact via an intervening cushioning element 50, such as o-rings.

Figure 8:
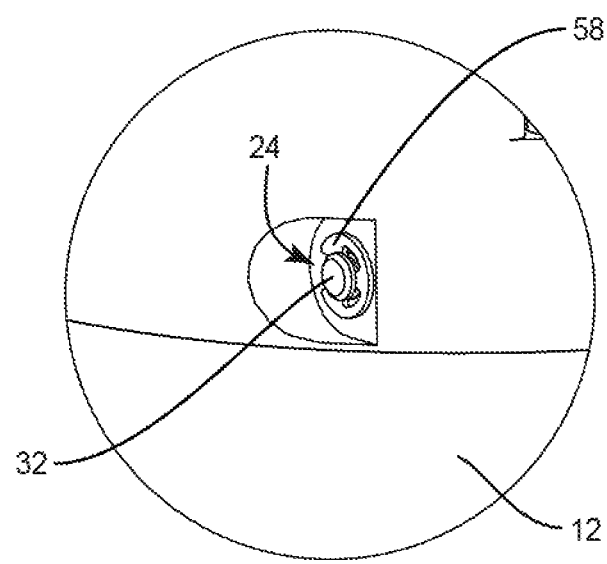
FIG. 8 is an enlarged perspective view showing the locking of one end of the lockout rod.

In one embodiment, a boss 32 protrudes from one end of the lockout rod 24, along its longitudinal axis (see FIG. 2). As depicted in FIG. 8, the boss 32 fits into a corresponding hole in the tool housing 12, holding the lockout rod 24 in position and allowing it to freely rotate about its longitudinal axis. In one embodiment, the boss 32 protrudes slightly to the exterior of the corresponding hole in the housing 12. A concentric groove 34 proximate the distal end of the boss 32, which protrudes from the housing 12 when assembled, accepts a securing device, such as a circlip 58, which holds the lockout rod 24 in position within the housing 12. In one embodiment, a key 36 on the opposite end of the lockout rod 24 accepts a corresponding tool, to rotate the lockout rod 24. The key may comprise any shape, such as a simple slot engaged by a flathead screwdriver, a cross shape engaged by a Phillips head screwdriver, or any other known or custom shape.

Figure 9:
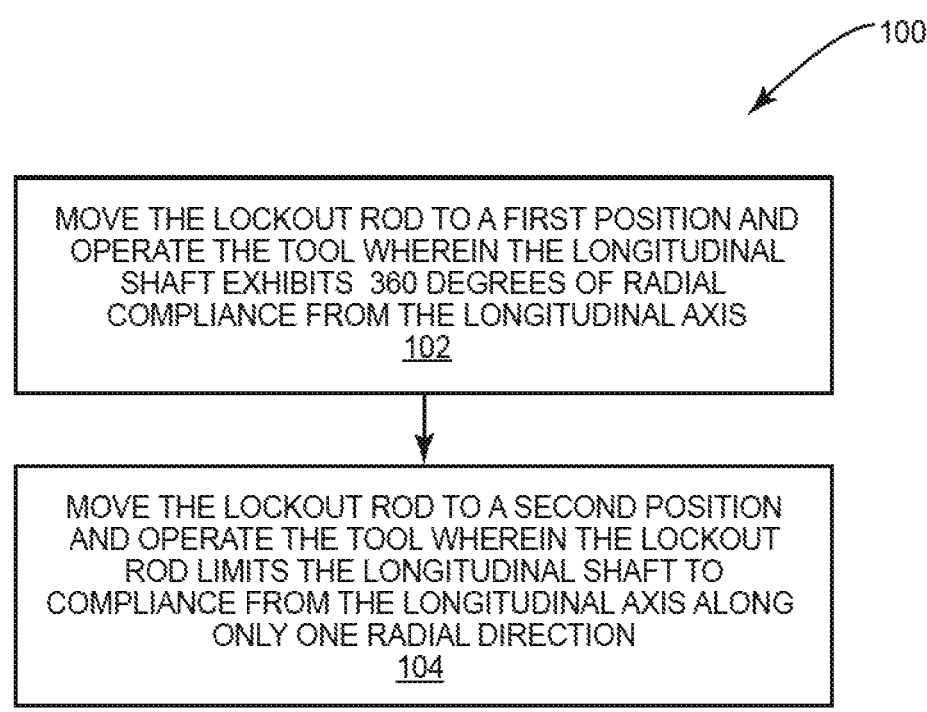
FIG. 9 is a flow diagram of a method of operating a radially compliant robotic tool.

FIG. 9 depicts a method 100 of operating a radially compliant robotic tool 10 comprising a housing 12, a longitudinal shaft 14 extending from the housing 12 and defining a longitudinal axis 20 in a default, centered state, and a lockout rod 24 disposed transverse to the longitudinal axis 20. The lockout rod 24 is moved to a first position and the tool 10 is operated wherein the longitudinal shaft 14 exhibits 360 degrees of radial compliance from the longitudinal axis 20 (block 102). The lockout rod 24 is moved to a second position and the tool 10 is operated wherein the lockout rod 24 limits the longitudinal shaft 14 to compliance from the longitudinal axis 20 along only one radial direction (block 104).

Embodiments of the present invention provide a compact, simple, inexpensive robotic tool 10 having two compliance modes. In one embodiment, by rotating a lockout rod 24 to a first position, the tool 10 is placed in a first compliance mode in which a longitudinal shaft 14 exhibits full radial compliance from a longitudinal axis 20. By rotating the lockout rod 24 to a second position, the tool 10 is placed in a second compliance mode in which the longitudinal shaft 14 is limited to compliance from the longitudinal axis 20 along only one radial position. The same tool 10 may thus supply robotic markets having different compliance demands. Furthermore, since the compliance mode selection is simple and may be selected by a user, the same tool may be configured for both single axis and multi axis programming tasks.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A radially compliant robotic tool, comprising:
   a housing;
   a longitudinal shaft extending from the housing and defining a longitudinal axis in a default, centered state;
   a lockout rod disposed transverse to the longitudinal axis, the lockout rod moveable between a first position wherein the longitudinal shaft exhibits 360 degrees of radial compliance from the longitudinal axis, and a second position wherein the lockout rod limits the longitudinal shaft to compliance from the longitudinal axis along only one radial direction.

2. The tool of claim 1 further comprising a two-axis gimbal comprising inner and outer concentric rings, and wherein in the first position, the lockout rod does not limit either the inner or outer ring throughout the range of compliance of the longitudinal shaft and wherein in the second position, the lockout rod limits the outer ring from tilting, preventing the outer gimbal ring from tilting about its tilt axis, thus limiting compliance of the longitudinal shaft to that provided by tilting of the inner gimbal ring.

3. The tool of claim 2 wherein the lockout rod moves between the first and second positions by rotating about a longitudinal axis of the lockout rod.

4. The tool of claim 3 wherein the lockout rod has generally cylindrical portions on either end, and at least a first cutout between the cylindrical end portions and extending the length of the lockout rod corresponding to the outer gimbal ring.

5. The tool of claim 4 wherein in the first position, the first cutout faces outer gimbal ring and no part of the lockout rod contacts the outer gimbal ring throughout its range of tilting about its tilt axis.

6. The tool of claim 4 wherein in the second position, the first cutout does not face the outer gimbal ring and the lockout rod prevents the outer gimbal ring from tilting about its tilt axis.

7. The tool of claim 4 wherein the lockout rod comprises a second cutout opposite the first cutout and wherein the lockout rod has two first positions and two second positions, and alternates between successive ones of the first and second positions as it is rotated successively through 90 degrees about its longitudinal axis.

8. The tool of claim 7 further comprising a plunger biased toward the lockout rod and contacting the lockout rod on one cylindrical end portion thereof, and wherein the lockout rod includes detent recesses every 90 degrees about its circumference corresponding to the two first and the two second positions of the lockout rod.

9. The tool of claim 4 wherein the lockout rod further comprises a boss extending from one end along a longitudinal axis of the lockout rod, and wherein the boss engages a corresponding hole in the housing.

10. The tool of claim 9 wherein the lockout rod further comprises a key in the end opposite the boss, wherein the key is operative to accept a corresponding tool to rotate the lockout rod about its longitudinal axis.

11. The tool of claim 4 further comprising one or more cushioning elements interposed between the lockout rod and the outer gimbal ring.

12. The tool of claim 11 wherein the one or more cushioning elements comprise two or more o-rings disposed in corresponding seating grooves formed in the surface of the outer gimbal ring facing the lockout rod.

13. A method of operating a radially compliant robotic tool comprising a housing, a longitudinal shaft extending from the housing and defining a longitudinal axis in a default, centered state, and a lockout rod disposed transverse to the longitudinal axis, the method comprising:
   moving the lockout rod to a first position and operating the tool wherein the longitudinal shaft exhibits 360 degrees of radial compliance from the longitudinal axis; and
   moving the lockout rod to a second position and operating the tool wherein the lockout rod limits the longitudinal shaft to compliance from the longitudinal axis along only one radial direction.

14. The method of claim 13 further comprising a two-axis gimbal comprising inner and outer concentric rings, and wherein in the first position, the lockout rod does not limit the outer ring throughout the range of compliance of the longitudinal shaft and wherein in the second position, the lockout rod limits the outer ring from tilting, preventing the outer gimbal ring from tilting about its tilt axis, thus limiting compliance of the longitudinal shaft to that provided by tilting of the inner ring.

15. The method of claim 13 wherein the lockout rod moves between the first and second positions by rotating about a longitudinal axis of the lockout rod.

16. The method of claim 13 wherein the lockout rod has generally cylindrical portions on either end, and at least a first cutout between the cylindrical end portions and extending the length of the lockout rod corresponding to the outer gimbal ring.

17. The method of claim 16 wherein in the first position, the first cutout faces the outer gimbal ring and no part of the lockout rod contacts the outer gimbal ring throughout its range of tilting about its tilt axis.

18. The method of claim 16 wherein in the second position, the first cutout does not face the outer gimbal ring and the lockout rod prevents the outer gimbal ring from tilting about its tilt axis.

19. The method of claim 16 wherein the lockout rod comprises a second cutout opposite the first cutout, and wherein the lockout rod has two first positions and two second positions, and alternates between successive ones of the first and second positions as it is rotated successively through 90 degrees about its longitudinal axis.

20. The method of claim 19 further comprising a plunger biased toward the lockout rod and contacting the lockout rod on one cylindrical end portion thereof, and wherein the lockout rod includes detent recesses every 90 degrees about its circumference corresponding to the two first and the two second positions of the lockout rod.

21. The method of claim 16 wherein the lockout rod further comprises a boss extending from one end along a longitudinal axis of the lockout rod, and wherein the boss engages a corresponding hole in the housing.

22. The method of claim 21 wherein the lockout rod further comprises a key in the end opposite the end having the boss, wherein the key is operative to accept a corresponding tool to rotate the lockout rod about its longitudinal axis.

23. The method of claim 16 further comprising one or more cushioning elements interposed between the lockout rod and the outer gimbal ring.

24. The method of claim 23 wherein the one or more cushioning elements comprise two or more o-rings disposed in corresponding chambers formed in the surface of the outer gimbal ring facing the lockout rod.

* * * * *